US008692608B2

(12) United States Patent
Chen (10) Patent No.: US 8,692,608 B2
(45) Date of Patent: Apr. 8, 2014

(54) CHARGE PUMP SYSTEM CAPABLE OF STABILIZING AN OUTPUT VOLTAGE

(75) Inventor: Chien-Liang Chen, Taoyuan County (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 73 days.

(21) Appl. No.: 13/236,590

(22) Filed: Sep. 19, 2011

(65) Prior Publication Data

US 2013/0069711 A1    Mar. 21, 2013

(51) Int. Cl.
*G05F 1/10* (2006.01)

(52) U.S. Cl.
USPC .......................................... 327/536; 363/60

(58) Field of Classification Search
USPC ....................... 327/536; 363/59–60
See application file for complete search history.

(56) References Cited

U.S. PATENT DOCUMENTS

| 3,663,828 | A |   | 5/1972 | Low |
| 3,818,402 | A |   | 6/1974 | Golaski |
| 4,163,944 | A |   | 8/1979 | Chambers |
| 4,245,355 | A |   | 1/1981 | Pascoe |
| 4,409,608 | A |   | 10/1983 | Yoder |
| 4,816,784 | A |   | 3/1989 | Rabjohn |
| 4,847,518 | A | * | 7/1989 | Leidich ......................... 327/541 |
| 4,893,070 | A | * | 1/1990 | Milberger et al. ............ 323/270 |
| 5,070,538 | A | * | 12/1991 | Milberger et al. ............ 455/126 |
| 5,159,205 | A |   | 10/1992 | Gorecki |
| 5,208,725 | A |   | 5/1993 | Akcasu |
| 5,212,653 | A |   | 5/1993 | Tanaka |
| 5,406,447 | A |   | 4/1995 | Miyazaki |
| 5,446,309 | A |   | 8/1995 | Adachi |
| 5,583,359 | A |   | 12/1996 | Ng |
| 5,637,900 | A |   | 6/1997 | Ker |
| 5,642,072 | A | * | 6/1997 | Miyamoto et al. ............ 327/535 |
| 5,754,476 | A | * | 5/1998 | Caser et al. ............... 365/185.29 |
| 5,760,456 | A |   | 6/1998 | Grzegorek |
| 5,770,964 | A | * | 6/1998 | Suma ............................. 327/328 |
| 5,808,330 | A |   | 9/1998 | Rostoker |
| 5,818,290 | A | * | 10/1998 | Tsukada ........................ 327/537 |
| 5,923,225 | A |   | 7/1999 | De Los Santos |
| 5,959,820 | A |   | 9/1999 | Ker |
| 6,008,102 | A |   | 12/1999 | Alford |
| 6,066,979 | A | * | 5/2000 | Adams et al. .................. 327/540 |
| 6,081,146 | A |   | 6/2000 | Shiochi |
| 6,157,022 | A | * | 12/2000 | Maeda et al. ............. 250/214 R |
| 6,172,378 | B1 |  | 1/2001 | Hull |
| 6,194,739 | B1 |  | 2/2001 | Ivanov |
| 6,246,271 | B1 |  | 6/2001 | Takada |
| 6,285,578 | B1 |  | 9/2001 | Huang |
| 6,291,872 | B1 |  | 9/2001 | Wang |
| 6,370,372 | B1 |  | 4/2002 | Molnar |
| 6,407,412 | B1 |  | 6/2002 | Iniewski |

(Continued)

*Primary Examiner* — Thomas J Hiltunen
(74) *Attorney, Agent, or Firm* — Winston Hsu; Scott Margo (57) ABSTRACT

A charge pump system includes a charge pump, a ring oscillator, a comparing circuit and a discharge circuit. When an output voltage of the charge pump is relatively low, the comparing circuit turns on the ring oscillator to make the ring oscillator provide an oscillation output to the charge pump to raise the output voltage of the charge pump. When the output voltage of the charge pump is relatively high, the comparing circuit turns off the ring oscillator to stop the ring oscillator from providing the oscillation output to the charge pump, the comparing circuit also makes the discharge circuit provide a discharge path to the charge pump to quickly reduce the output voltage of the charge pump.

33 Claims, 13 Drawing Sheets

(56) References Cited

U.S. PATENT DOCUMENTS

| | | |
|---|---|---|
| 6,427,226 B1 | 7/2002 | Mallick |
| 6,448,858 B1 | 9/2002 | Helms |
| 6,452,442 B1 | 9/2002 | Laude |
| 6,456,221 B2 | 9/2002 | Low |
| 6,461,914 B1 | 10/2002 | Roberts |
| 6,480,137 B2 | 11/2002 | Kulkarni |
| 6,483,188 B1 | 11/2002 | Yue |
| 6,486,765 B1 | 11/2002 | Katayanagi |
| 6,509,805 B2 | 1/2003 | Ochiai |
| 6,515,903 B1 * | 2/2003 | Le et al. .................. 365/185.18 |
| 6,518,165 B1 | 2/2003 | Yoon |
| 6,521,939 B1 | 2/2003 | Yeo |
| 6,545,547 B2 | 4/2003 | Fridi |
| 6,545,917 B2 * | 4/2003 | Kim ........................ 365/189.08 |
| 6,560,306 B1 | 5/2003 | Duffy |
| 6,588,002 B1 | 7/2003 | Lampaert |
| 6,593,838 B2 | 7/2003 | Yue |
| 6,603,360 B2 | 8/2003 | Kim |
| 6,608,363 B1 | 8/2003 | Fazelpour |
| 6,611,223 B2 | 8/2003 | Low |
| 6,625,077 B2 | 9/2003 | Chen |
| 6,630,897 B2 | 10/2003 | Low |
| 6,639,298 B2 | 10/2003 | Chaudhry |
| 6,653,868 B2 | 11/2003 | Oodaira |
| 6,668,358 B2 | 12/2003 | Friend |
| 6,700,771 B2 | 3/2004 | Bhattacharyya |
| 6,720,608 B2 | 4/2004 | Lee |
| 6,724,677 B1 | 4/2004 | Su |
| 6,756,656 B2 | 6/2004 | Lowther |
| 6,757,203 B2 * | 6/2004 | Wake ....................... 365/189.09 |
| 6,795,001 B2 | 9/2004 | Roza |
| 6,796,017 B2 | 9/2004 | Harding |
| 6,798,011 B2 | 9/2004 | Adan |
| 6,810,242 B2 | 10/2004 | Molnar |
| 6,822,282 B2 | 11/2004 | Randazzo |
| 6,822,312 B2 | 11/2004 | Sowlati |
| 6,833,756 B2 | 12/2004 | Ranganathan |
| 6,841,847 B2 | 1/2005 | Sia |
| 6,847,572 B2 | 1/2005 | Lee |
| 6,853,272 B1 | 2/2005 | Hughes |
| 6,876,056 B2 | 4/2005 | Tilmans |
| 6,885,534 B2 | 4/2005 | Ker |
| 6,901,126 B1 | 5/2005 | Gu |
| 6,905,889 B2 | 6/2005 | Lowther |
| 6,909,149 B2 | 6/2005 | Russ |
| 6,927,664 B2 | 8/2005 | Nakatani |
| 6,933,764 B2 * | 8/2005 | Devin ........................... 327/309 |
| 6,958,522 B2 | 10/2005 | Clevenger |
| 7,002,381 B1 * | 2/2006 | Chung .......................... 327/131 |
| 7,009,252 B2 | 3/2006 | Lin |
| 7,027,276 B2 | 4/2006 | Chen |
| 7,119,604 B2 * | 10/2006 | Chih ............................ 327/534 |
| 7,157,960 B2 | 1/2007 | Kim |
| 7,205,612 B2 | 4/2007 | Cai |
| 7,262,069 B2 | 8/2007 | Chung |
| 7,279,961 B2 * | 10/2007 | Chan et al. .................... 327/540 |
| 7,365,627 B2 | 4/2008 | Yen |
| 7,368,761 B1 | 5/2008 | Lai |
| 7,405,642 B1 | 7/2008 | Hsu |
| 7,427,890 B2 * | 9/2008 | Chan ............................ 327/536 |
| 7,502,264 B2 * | 3/2009 | Rodgers et al. .......... 365/185.18 |
| 7,570,104 B2 * | 8/2009 | Hsu .............................. 327/536 |
| 7,612,603 B1 | 11/2009 | Petricek |
| 7,649,402 B1 * | 1/2010 | Chen ............................ 327/536 |
| 7,672,100 B2 | 3/2010 | Van Camp |
| 2002/0019123 A1 | 2/2002 | Ma |
| 2002/0036545 A1 | 3/2002 | Fridi |
| 2002/0188920 A1 | 12/2002 | Lampaert |
| 2003/0076636 A1 | 4/2003 | Ker |
| 2003/0102901 A1 * | 6/2003 | Ooishi .......................... 327/512 |
| 2003/0127691 A1 | 7/2003 | Yue |
| 2003/0183403 A1 | 10/2003 | Kluge |
| 2005/0068112 A1 | 3/2005 | Glenn |
| 2005/0068113 A1 | 3/2005 | Glenn |
| 2005/0087787 A1 | 4/2005 | Ando |
| 2006/0006431 A1 | 1/2006 | Jean |
| 2006/0108694 A1 | 5/2006 | Hung |
| 2006/0267102 A1 | 11/2006 | Cheng |
| 2007/0102745 A1 | 5/2007 | Hsu |
| 2007/0210416 A1 | 9/2007 | Hsu |
| 2007/0234554 A1 | 10/2007 | Hung |
| 2007/0246801 A1 | 10/2007 | Hung |
| 2007/0249294 A1 | 10/2007 | Wu |
| 2007/0296055 A1 | 12/2007 | Yen |
| 2008/0094166 A1 | 4/2008 | Hsu |
| 2008/0185679 A1 | 8/2008 | Hsu |
| 2008/0189662 A1 | 8/2008 | Nandy |
| 2008/0200132 A1 | 8/2008 | Hsu |
| 2008/0299738 A1 | 12/2008 | Hsu |
| 2008/0303623 A1 | 12/2008 | Hsu |
| 2009/0029324 A1 | 1/2009 | Clark |
| 2009/0146624 A1 * | 6/2009 | Kim et al. ..................... 323/271 |
| 2009/0201625 A1 | 8/2009 | Liao |
| 2010/0279484 A1 | 11/2010 | Wang |

\* cited by examiner

CHARGE PUMP SYSTEM CAPABLE OF STABILIZING AN OUTPUT VOLTAGE

BACKGROUND OF THE INVENTION

1. Field of the Invention

The present invention relates to a charge pump system, especially refers to a charge pump system having function of voltage detection.

2. Description of the Prior Art

Figure 1:
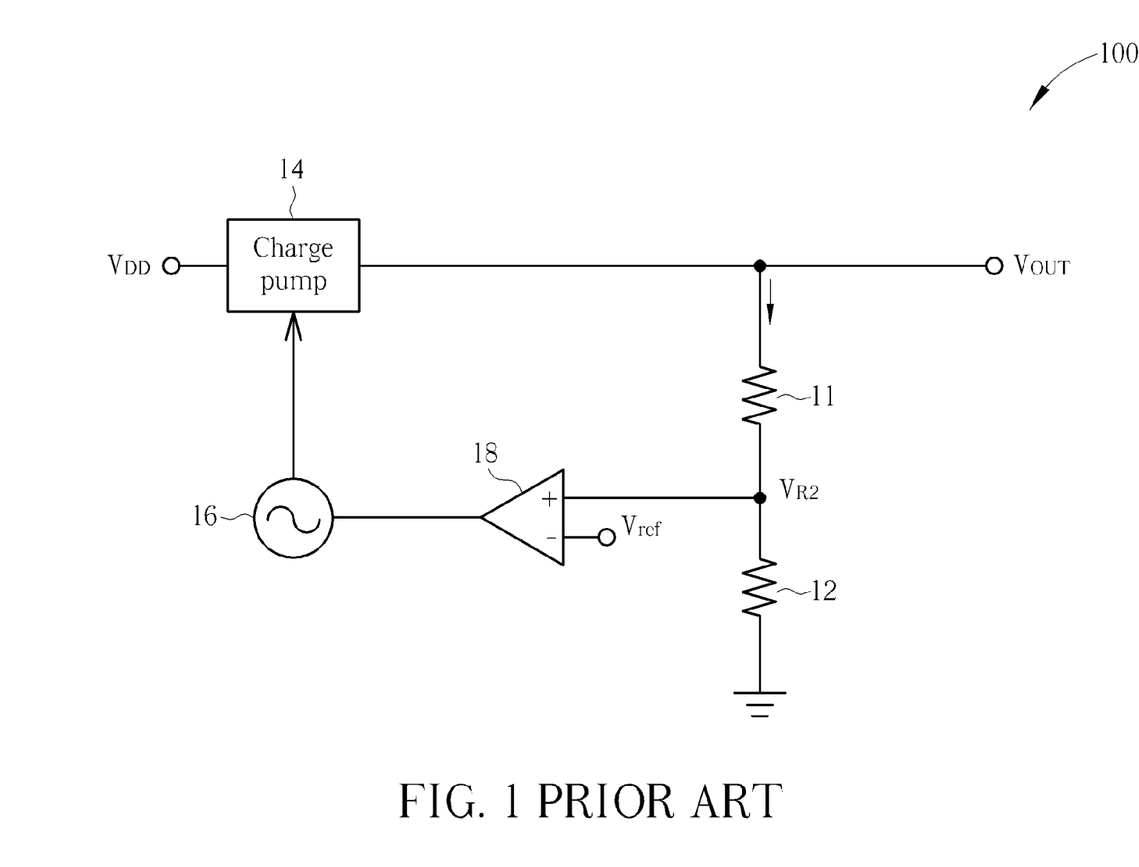
FIG. 1 shows a prior art charge pump system.

Charge pumps are widely used in electronic circuitry. Please refer to FIG. 1. FIG. 1 shows a prior art charge pump system 100. The charge pump system 100 includes a charge pump 14, an oscillator 16, a comparator 18, a first resistor 11 and a second resistor 12. The charge pump 14 is coupled to an input voltage $V_{DD}$ and receives signals from the oscillator 16 for providing an output voltage $V_{OUT}$. The charge pump system 100 generates a second resistor voltage $V_{R2}$ via a current flowing through the first resistor 11 and the second resistor 12 to control the operation of the oscillator 16 by comparing the second resistor voltage $V_{R2}$ with a reference voltage $V_{ref}$.

However, the first resistor 11 and the second resistor 12 may cause the charge pump system 100 to generate a leakage current, dropping and making the output voltage $V_{OUT}$ unstable. A common method for solving the above problems is to increase the resistance of the first resistor 11 and the second resistor 12. However, the increase of the resistance of the first resistor 11 and the second resistor 12 may cause delay to the output voltage $V_{OUT}$. Thus the charge pump system 100 cannot achieve a desirable performance.

SUMMARY OF THE INVENTION

An embodiment of the present invention provides a charge pump system including a charge pump, a ring oscillator, a comparing circuit and a discharge circuit. The charge pump includes an output end for providing an output voltage. The ring oscillator includes an output end coupled to a control end of the charge pump for providing an oscillation output to the charge pump. The comparing circuit includes a first impedance, a second impedance and a comparator. The first impedance has a first end coupled to the output end of the charge pump. The second impedance has a first end coupled to a second end of the first impedance, and a second end coupled to ground. The comparator includes a first input end coupled to the second end of the first impedance, a second input end for receiving a reference voltage, and an output end. The discharge circuit includes a first switch, a second switch and a third impedance. The first switch has a first end coupled to the output end of the charge pump, and a control end coupled to the output end of the comparator. The second switch has a first end coupled to a second end of the first switch, and a second end coupled to the ground. The third impedance has a first end coupled to the output end of the charge pump, and a second end coupled to a control end of the second switch.

Another embodiment of the present invention provides a charge pump system including a charge pump, a ring oscillator, a comparing circuit and a charge circuit. The charge pump includes an output end for providing an output voltage. The ring oscillator includes an output end coupled to a control end of the charge pump for providing an oscillation output to the charge pump. The comparing circuit includes a first impedance, a second impedance and a comparator. The first impedance has a first end coupled a bias voltage source. The second impedance has a first end coupled to a second end of the first impedance, and a second end coupled to the output end of the charge pump. The comparator includes a first input end coupled to the second end of the first impedance, a second input end for receiving a reference voltage, and an output end. The charge circuit includes a first switch, a second switch and a third impedance. The first switch has a first end coupled to the bias voltage source. The second switch has a first end coupled to a second end of the first switch, a control end coupled to the output end of the comparator, and a second end coupled to the output end of the charge pump. The third impedance has a first end coupled to a control end of the first switch, and a second end coupled to the output end of the charge pump.

The charge pump systems of the present invention can charge/discharge quickly and reduce leakage currents. Further, they can provide stable output voltages with little time delay.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
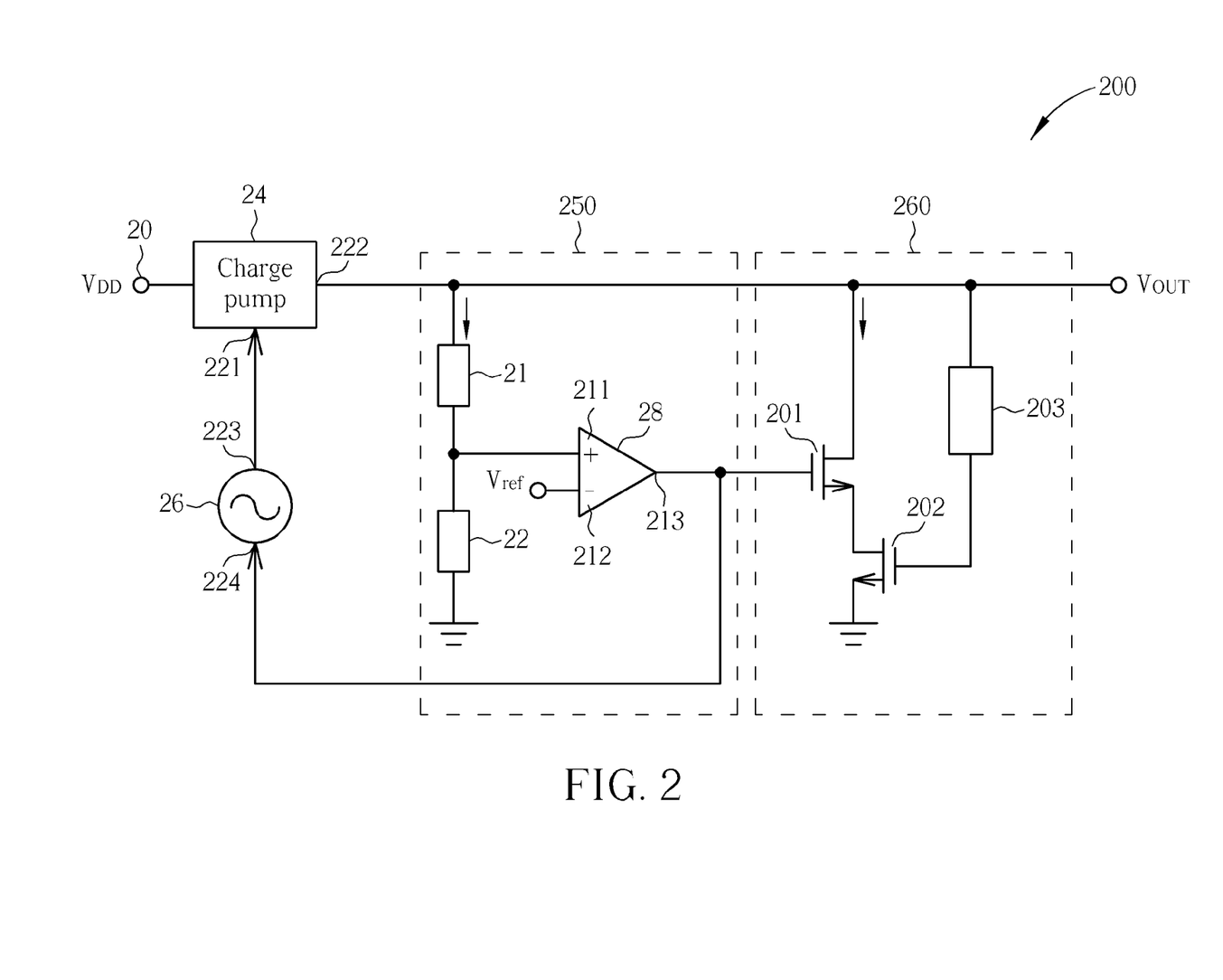
FIG. 2 shows the charge pump system of the first embodiment of the present invention.

Please refer to FIG. 2. FIG. 2 shows a charge pump system 200 of the first embodiment of the present invention. The charge pump system 200 includes a charge pump 24, a ring oscillator 26, a comparing circuit 250 and a discharge circuit 260. The charge pump 24 includes an input end 20 for receiving an input voltage $V_{DD}$, and an output end 222 for providing an output voltage $V_{OUT}$. An output end 223 of the ring oscillator 26 is coupled to a control end 221 of the charge pump 24 for providing an oscillation output to the charge pump 24. The comparing circuit 250 includes a first impedance 21, a second impedance 22 and a comparator 28. The first impedance 21 has a first end coupled to the output end 222 of the charge pump 24. The second impedance 22 has a first end coupled to a second end of the first impedance 21, and a second end coupled to ground. The comparator 28 includes a first input end 211, a second input end 212 and an output end 213. The first input end 211 is coupled to the second end of the first impedance 21. The second input end 212 is used for receiving a reference voltage $V_{ref}$. The output end 213 of the comparator 28 is coupled to an input end 224 of the ring oscillator 26. The discharge circuit 260 includes a first switch 201, a second switch 202 and a third impedance 203. The first switch 201 has a first end coupled to the output end 222 of the charge pump 24, and a control end coupled to the output end 213 of the comparator 28. The second switch 202 has a first end coupled to the second end of the first switch 201, and a second end coupled to ground. The second switch is an NMMOS transistor and is always turned on. The third impedance 203 has a first end coupled to the output end 222 of the charge pump 24, and a second end coupled to a control end of the second switch 202. The third impedance 203 is used for providing a voltage drop so as to reduce the voltage at the control end of the second switch 202. The first impedance 21 and the second impedance 22 are both resistors, capacitors, NMOS transistors or PMOS transistors. The third impedance 203 is a resistor, a capacitor or a diode.

When the charge pump 24 pulls up the output voltage $V_{OUT}$ of the output end 222 to a high voltage level, the voltage at the first input end 211 of the comparator 28 will exceed the reference voltage $V_{ref}$, thus the output end 213 of the comparator 28 will output a high voltage, turning on the first switch 201. When the output end 213 of the comparator 28 outputs a high voltage, the operation of the ring oscillator 26 will be stopped, stopping the charge pump 24 from pulling up the output voltage $V_{OUT}$ of the output end 222 so as to save power consumption of the charge pump system 200. On the other hand, when the first switch 201 is turned on, the output voltage $V_{OUT}$ will discharge through the first switch 201 until the voltage at the first input end 211 is lower than the reference voltage $V_{ref}$. When the voltage at the first input end 211 is lower than the reference voltage $V_{ref}$, the output end 213 of the comparator 28 will output a low voltage to turn off the first switch 201 and turn on the ring oscillator 26 to pull up the output voltage $V_{OUT}$ at the output end 222 of the charge pump 24 again.

Figure 3:
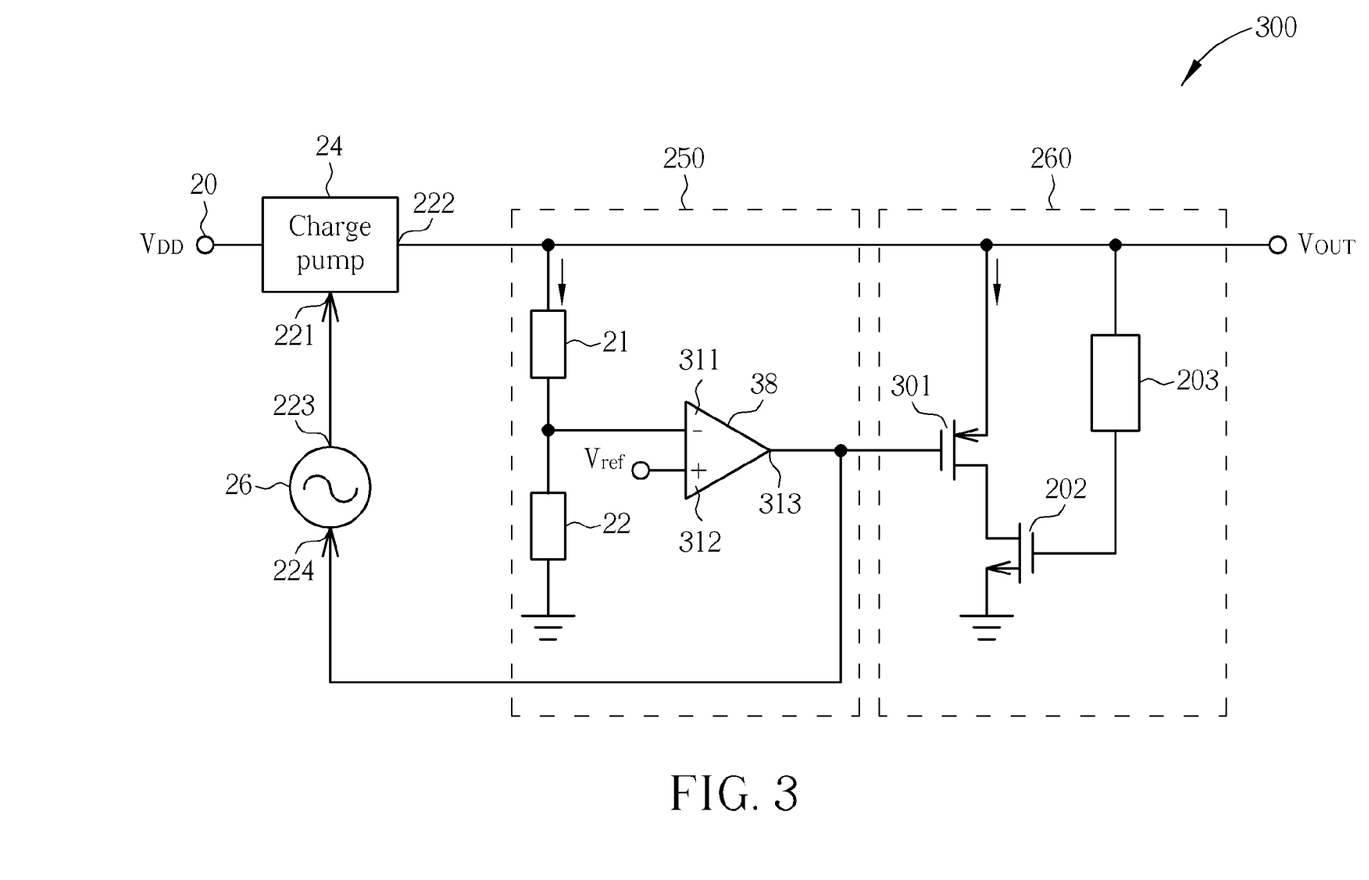
FIG. 3 shows the charge pump system of the second embodiment of the present invention.
Figure 4:
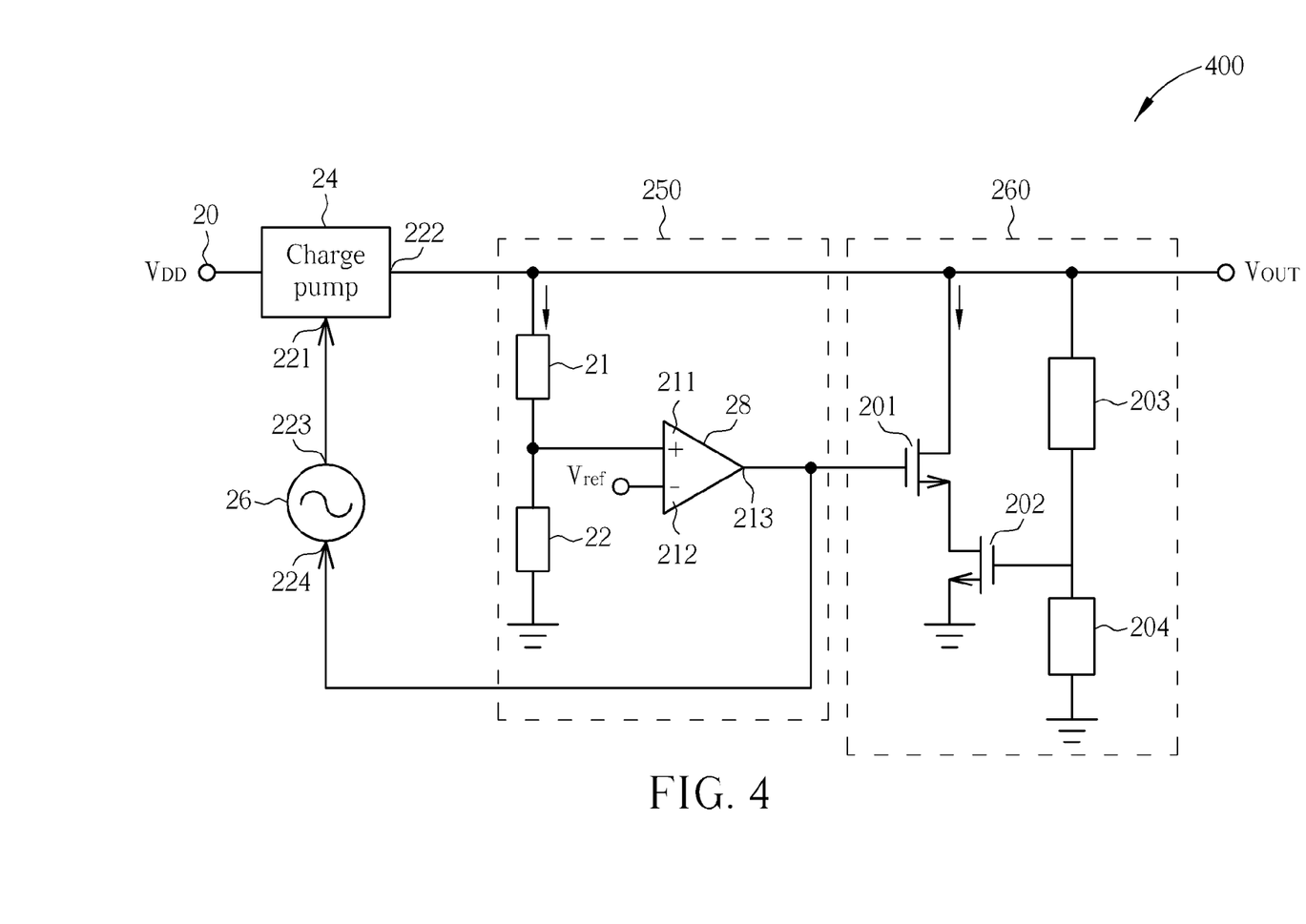
FIG. 4 shows the charge pump system of the third embodiment of the present invention.

In FIG. 2, the first input end 211 of the comparator 28 is a positive input end, the second input end 212 of the comparator 28 is a negative input end, and the first switch 201 is an NMOS transistor. Please refer to FIG. 3. FIG. 3 shows a charge pump system 300 of the second embodiment of the present invention. The difference between the charge pump system 300 and the charge pump system 200 lies in that the first input end 311 of the comparator 38 is a negative input end, the second input end 312 of the comparator 38 is a positive input end, and the first switch 301 is a PMOS transistor. In FIG. 3, when the charge pump 24 pulls up the output voltage $V_{OUT}$ of the output end 222 to a high voltage level, the voltage at the first input end 211 will exceed the reference value $V_{ref}$, thus the output end 313 of the comparator 38 will output a low voltage, turning on the first switch 201. When the output end 313 of the comparator 38 outputs a low voltage, the operation of the ring oscillator 26 will be stopped, stopping the charge pump 24 from pulling up the output voltage $V_{OUT}$ at the output end 222 to save power consumption of the charge pump system 300. On the other hand, when the first switch 301 is turned on, the output voltage $V_{OUT}$ will discharge through the first switch 301 until the voltage at the first input end 311 is lower than the reference voltage $V_{ref}$. When the voltage at the first input end 311 is lower than the reference voltage $V_{ref}$, the output end 313 of the comparator 38 will output a high voltage level, turning on the ring oscillator 26 to pull up the output voltage $V_{OUT}$ at the output end 222 of the charge pump 24 again Please refer to FIG. 4. FIG. 4 shows a charge pump system 400 of the third embodiment of the present invention. The difference between the charge pump system 400 and the charge pump system 200 lies in that the charge pump system 400 further comprises a fourth impedance 204. The fourth impedance 204 has a first end coupled to the second end of the third impedance 203, and a second end coupled to ground. The third impedance 203 and the fourth impedance 204 provide a voltage drop so as to reduce the voltage at the control end of the second switch 202. The third impedance 203 and the fourth impedance 204 are both resistors, capacitors or diodes. In the third embodiment, when the third impedance 203 and the fourth impedance 204 are both capacitors, the leakage current flowing through the third impedance 203 and the fourth impedance 204 to ground can be avoided.

Figure 5:
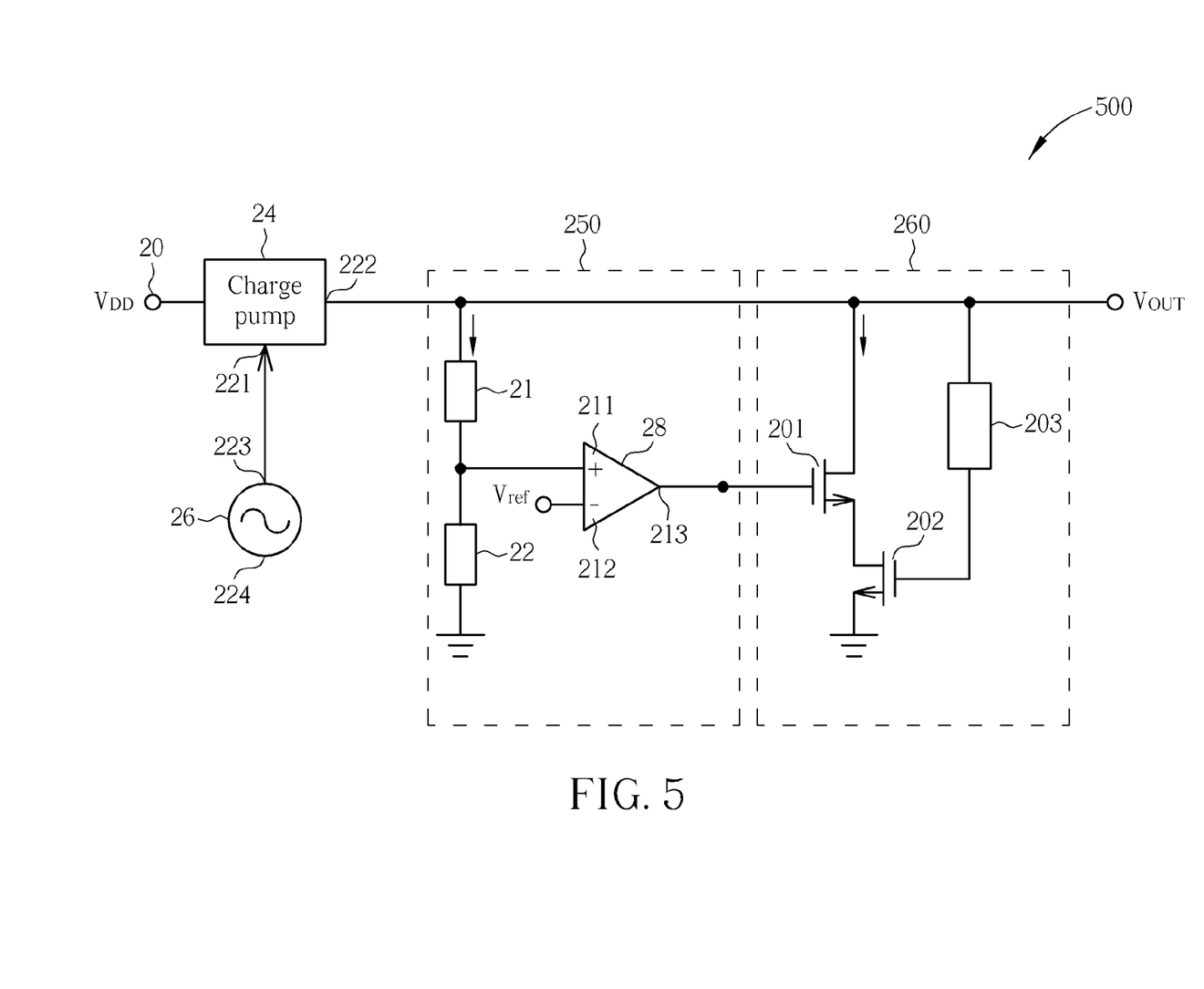
FIG. 5 shows the charge pump system of the fourth embodiment of the present invention.

Please refer to FIG. 5. FIG. 5 shows a charge pump system 500 of the fourth embodiment of the present invention. The difference between the charge pump system 500 and the charge pump system 200 is that the ring oscillator 26 of the charge pump system 500 is not coupled to the output end 213 of the comparator 28. Though the charge pump system 200 can save power by turning off the ring oscillator 26, the ring oscillator 26 requires a delay time to resume working. Through utilizing the configuration of the charge pump system 500, the output voltage $V_{OUT}$ at the output end 222 of the charge pump 24 can avoid the delay time due to the continuous operation of the ring oscillator 26.

In the first embodiment to the fourth embodiment, when the first impedance 21 and the second impedance 22 are both capacitors, the current flowing from the output end 222 of the charge pump 24 to ground through the first impedance 21 and the second impedance 22 can be avoided, thus stabilizing the output voltage $V_{OUT}$.

Figure 6:
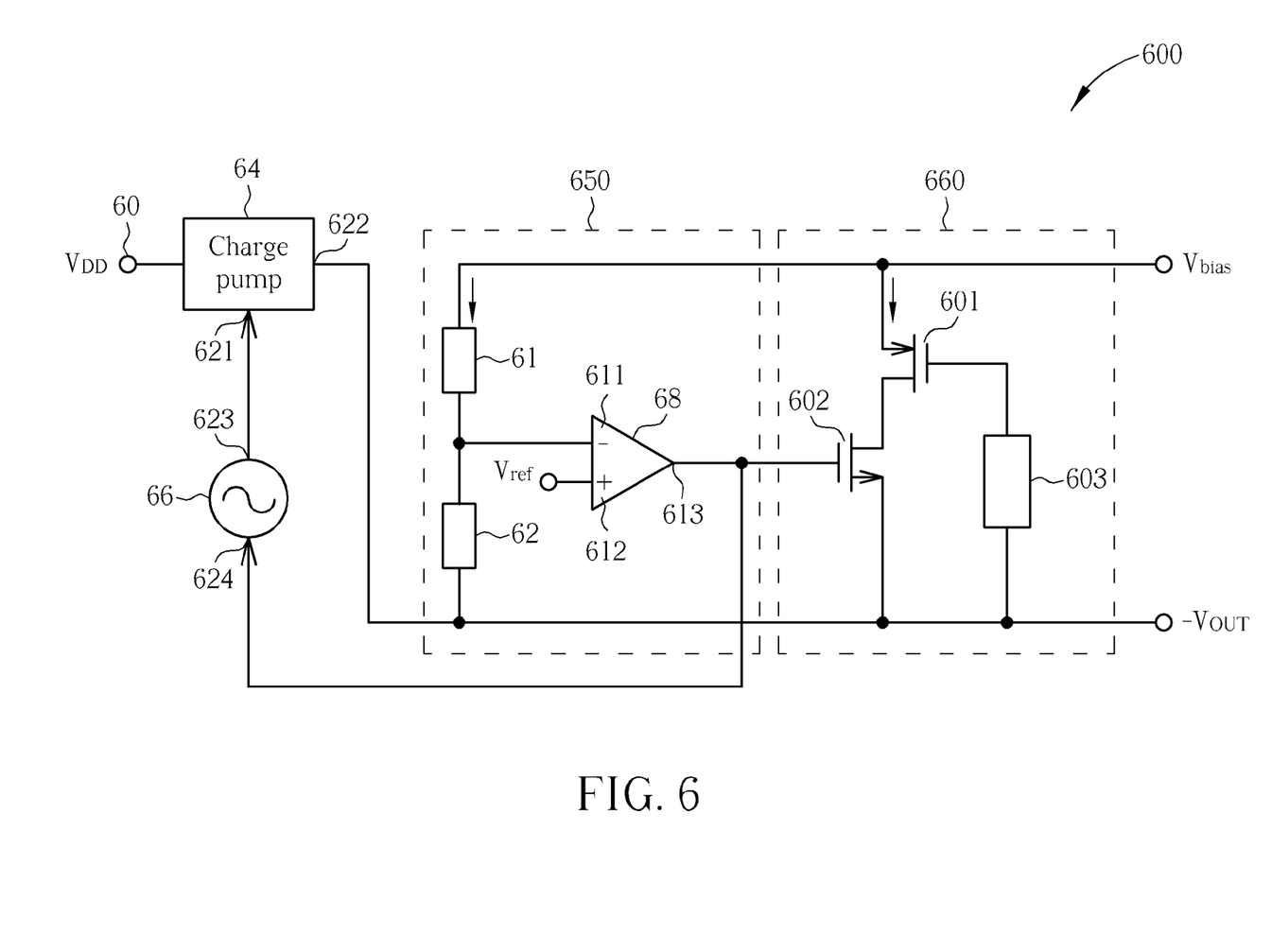
FIG. 6 shows the charge pump system of the fifth embodiment of the present invention.

Please refer to FIG. 6. FIG. 6 shows a charge pump system 600 of the fifth embodiment of the present invention. The charge pump system 600 includes a charge pump 64, a ring oscillator 66, a comparing circuit 650 and a charge circuit 660. The charge pump 64 includes an input end 60 for receiving an input voltage $V_{DD}$, and an output end 622 for providing an output voltage $-V_{OUT}$. An output end 623 of the ring oscillator 66 is coupled to a control end 621 of the charge pump 64 for providing an oscillation output to the charge pump 64. The comparing circuit 650 includes a first impedance 61, a second impedance 62 and a comparator 68. The first impedance 61 has a first end coupled to a bias voltage source $V_{bias}$. The second impedance 62 has a first end coupled to a second end of the first impedance 61, and a second end coupled to the output end 622 of the charge pump 64. The comparator 68 includes a first input end 611, a second input end 612 and an output end 613. The first input end 611 is coupled to the second end of the first impedance 61. The second input end 612 is used for receiving a reference voltage $V_{ref}$. The output end 613 of the comparator 68 is coupled to an input end 624 of the ring oscillator 66. The charge circuit 660 includes a first switch 601, a second switch 602 and a third impedance 603. The first switch 601 has a first end coupled to the bias voltage source $V_{bias}$, and the first switch 601 is a PMOS transistor and is always turned on. The second switch 602 has a first end coupled to the second end of the first switch 601, a control end coupled to the output end 613 of the comparator 68, and a second end coupled to the output end 622 of the charge pump 64. The third impedance 603 has a first end coupled to the control end of the first switch 601, and a second end coupled to the output end 622 of the charge pump 64. The third impedance 603 is used for providing a voltage drop so as to reduce the voltage at the control end of the first switch 601. The first impedance 61 and the second impedance 62 are both resistors, capacitors, NMOS transistors or PMOS transistors. The third impedance 603 is a resistor, a capacitor or a diode.

When the charge pump 64 pulls down the output voltage $-V_{OUT}$ of the output end 622 to a low voltage level, the voltage at the first input end 611 of the comparator 68 will be lower than the reference voltage $V_{ref}$, thus the output end 613 of the comparator 68 will output a high voltage, turning on the second switch 602. When the output end 613 of the comparator 68 outputs the high voltage, the operation of the ring oscillator 66 will be stopped, stopping the charge pump 64 from pulling down the output voltage $-V_{OUT}$ of the output end 622 so as to save power consumption of the charge pump system 600. On the other hand, when the second switch 602 is turned on, the bias voltage source $V_{bias}$ will charge the output voltage $-V_{OUT}$ through the first switch 601 and the second switch 602 until the voltage at the first input end 611 is greater than the reference voltage $V_{ref}$. When the voltage at the first input end 611 is greater than the reference voltage $V_{ref}$, the output end 613 of the comparator 68 will output a low voltage to turn off the second switch 602 and turn on the ring oscillator 66 to pull down the output voltage $-V_{OUT}$ at the output end 622 of the charge pump 64 again.

Figure 7:
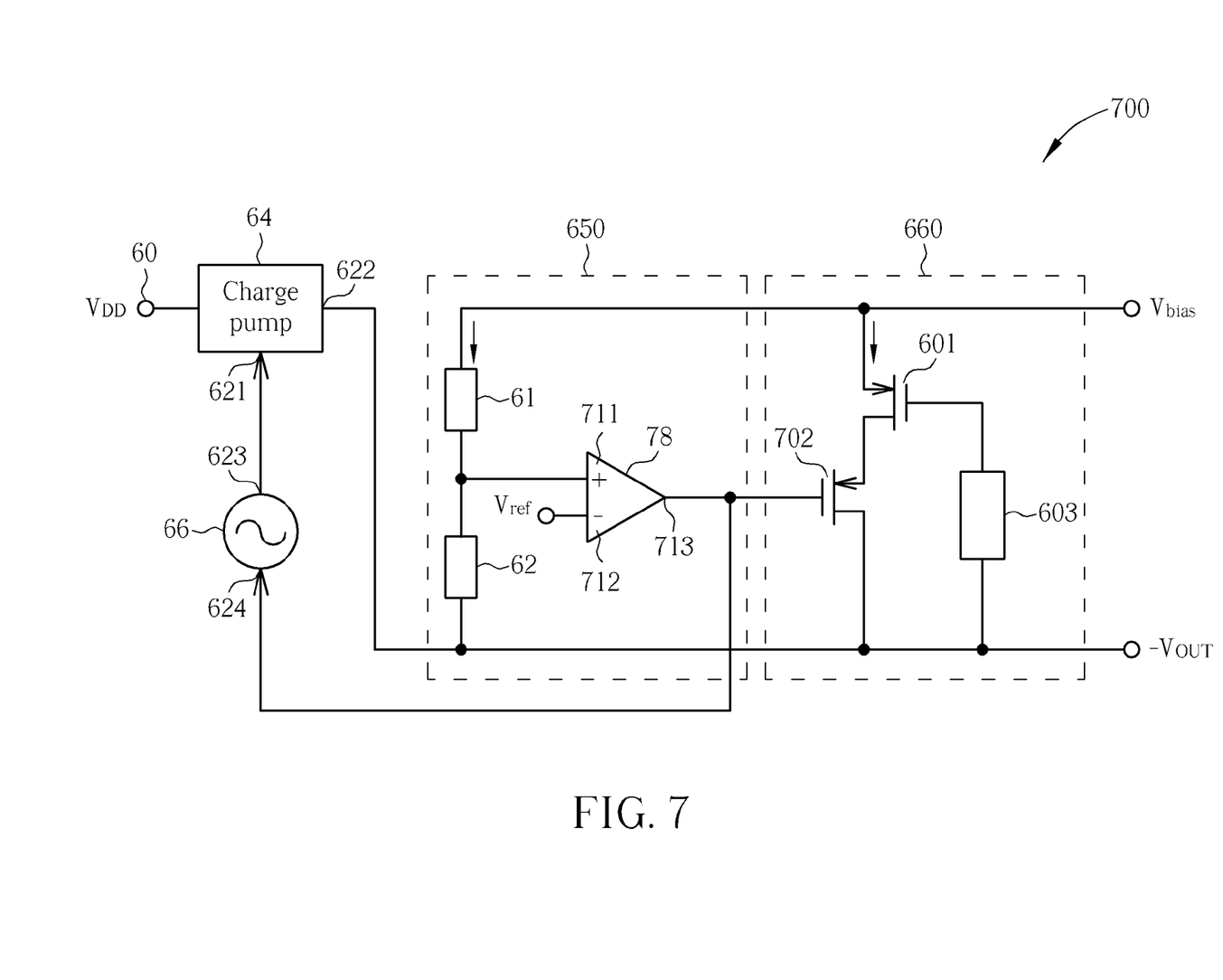
FIG. 7 shows the charge pump system of the sixth embodiment of the present invention.

In FIG. 6, the first input end 611 of the comparator 68 is a negative input end, the second input end 612 of the comparator 68 is a positive input end, and the second switch 602 is an NMOS transistor. Please refer to FIG. 7. FIG. 7 shows a charge pump system 700 of the sixth embodiment of the present invention. The difference between the charge pump system 700 and the charge pump system 600 lies in that the first input end 711 of the comparator 78 is a positive input end, the second input end 712 of the comparator 78 is a negative input end, and the second switch 702 is a PMOS transistor. In FIG. 7, when the charge pump 64 pulls down the output voltage $-V_{OUT}$ of the output end 622 to a low voltage level, the voltage at the first input end 711 will be lower than the reference voltage $V_{ref}$, thus the output end 713 of the comparator 78 will output a low voltage, turning on the second switch 702. When the output end 713 of the comparator 78 outputs a low voltage, the operation of the ring oscillator 66 will be stopped, stopping the charge pump 64 from pulling down the output voltage $-V_{OUT}$ at the output end 622 to save power consumption of the charge pump system 700. On the other hand, when the second switch 702 is turned on, the bias voltage source $V_{bias}$ will charge the output voltage $-V_{OUT}$ through the first switch 601 and the second switch 702 until the voltage at the first input end 711 is greater than the reference voltage $V_{ref}$. When the voltage at the first input end 711 is greater than the reference voltage $V_{ref}$, the output end 713 of the comparator 78 will output a high voltage, turning on the ring oscillator 66 to pull down the output voltage $-V_{OUT}$ at the output end 622 of the charge pump 64 again.

Figure 8:
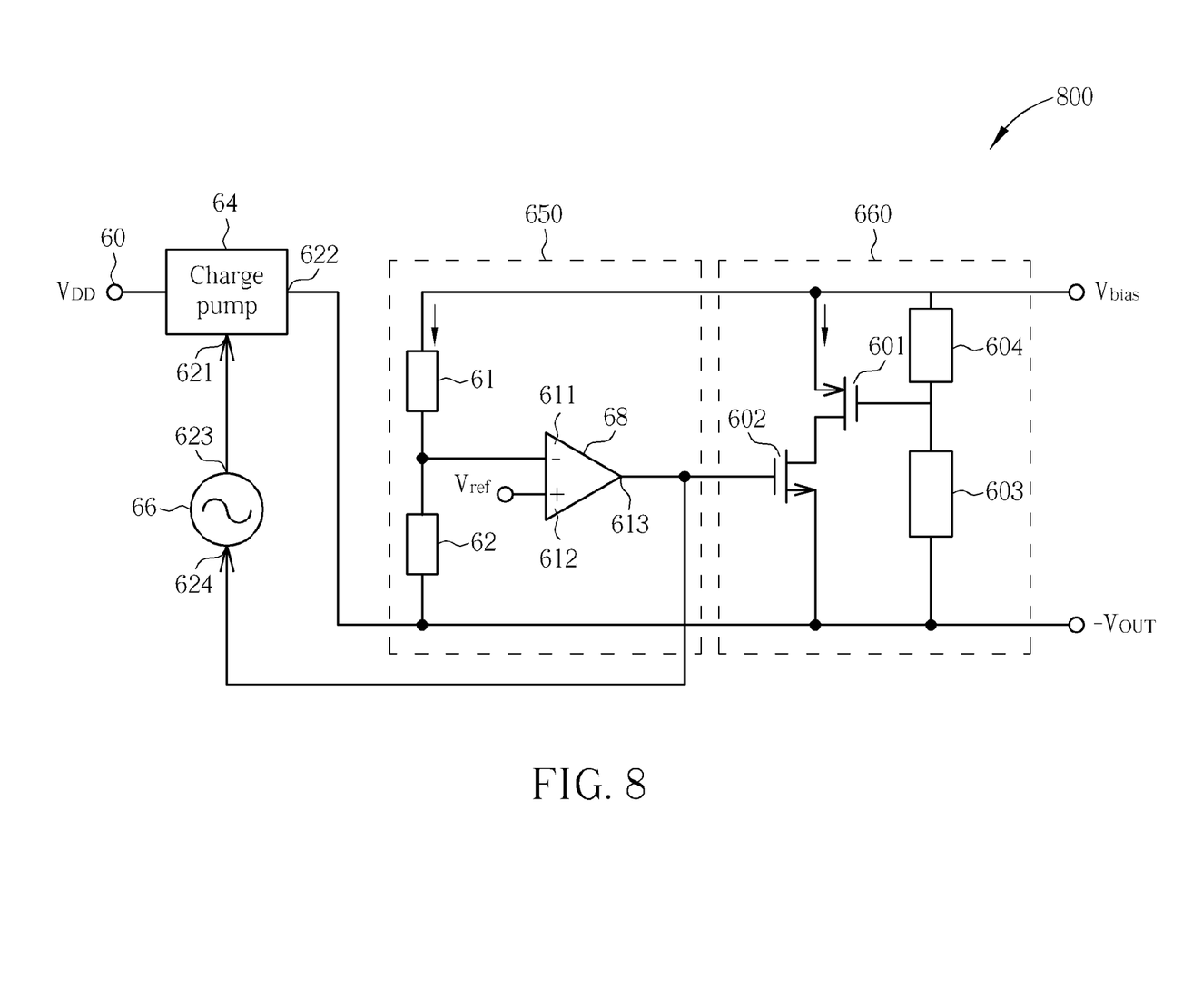
FIG. 8 shows the charge pump system of the seventh embodiment of the present invention.

Please refer to FIG. 8. FIG. 8 shows a charge pump system 800 of the seventh embodiment of the present invention. The difference between the charge pump system 800 and the charge pump system 600 lies in that the charge pump system 800 further comprises a fourth impedance 604. The fourth impedance 604 has a first end coupled to the bias voltage source $V_{bias}$, and a second end coupled to the first end of the third impedance 603. The third impedance 603 and the fourth impedance 604 provide a voltage drop so as to reduce the voltage at the control end of the first switch 601. The third impedance 603 and the fourth impedance 604 are both resistors, capacitors or diodes. In the seventh embodiment, when the third impedance 603 and the fourth impedance 604 are both capacitors, the leakage current flowing through the third impedance 603 and the fourth impedance 604 to ground can be avoided.

Figure 9:
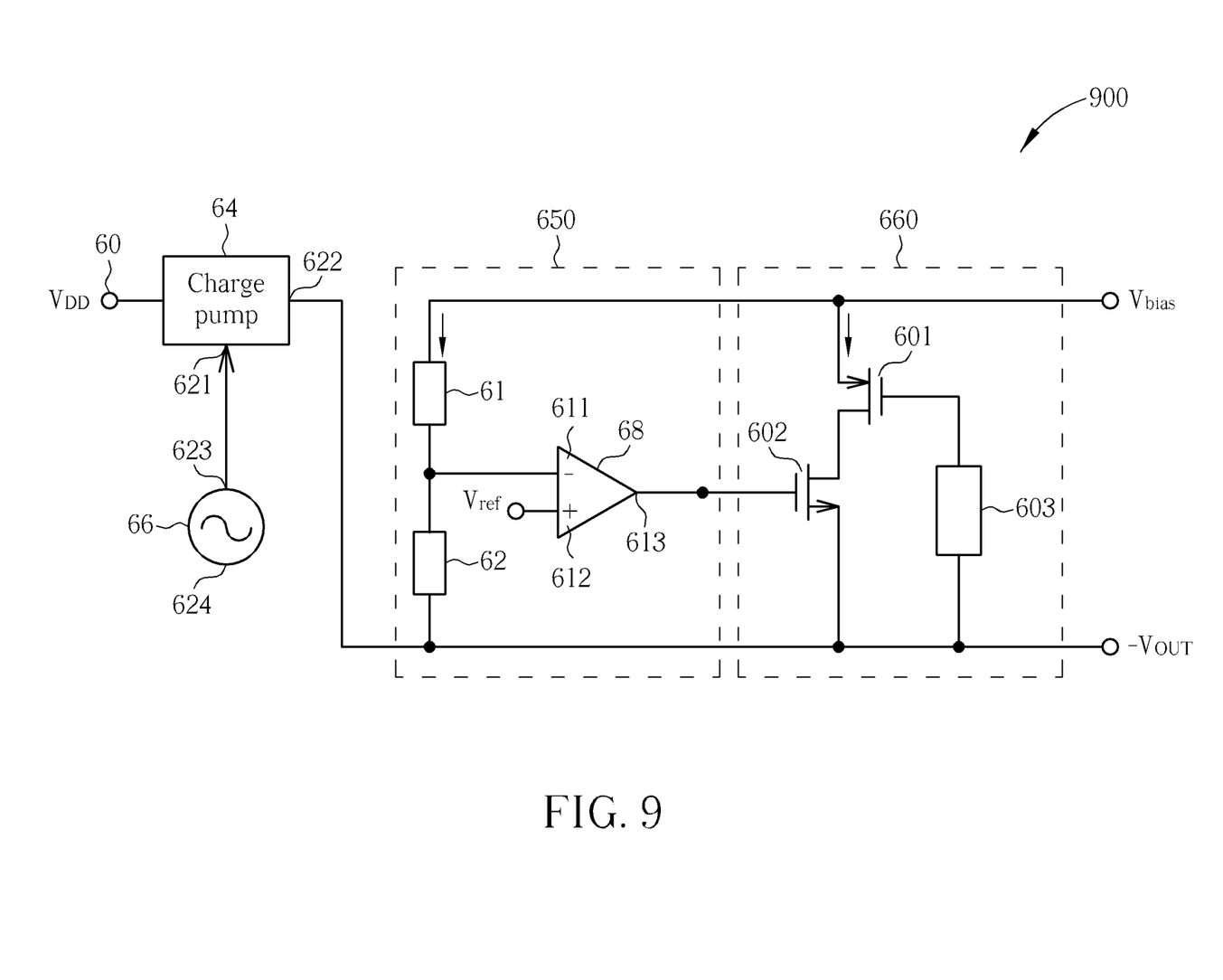
FIG. 9 shows the charge pump system of the eighth embodiment of the present invention.

Please refer to FIG. 9. FIG. 9 shows a charge pump system 900 of the eighth embodiment of the present invention. The difference between the charge pump system 900 and the charge pump system 600 is that the ring oscillator 66 of the charge pump system 900 is not coupled to the output end 613 of the comparator 68. Though the charge pump system 600 can save power by turning off the oscillator 66, the oscillator 66 requires a delay time to resume working. Through utilizing the configuration of the charge pump system 900, the output voltage $-V_{OUT}$ at the output end 622 of the charge pump 64 can avoid the delay time due to the continuous operation of the ring oscillator 66.

In the fifth embodiment to the eighth embodiment, when the first impedance 61 and the second impedance 62 are both capacitors, the current flowing through the first impedance 61 and the second impedance 62 to the output end 622 of the charge pump 64 can be avoided, thus stabilizing the output voltage $-V_{OUT}$.

Figure 10:
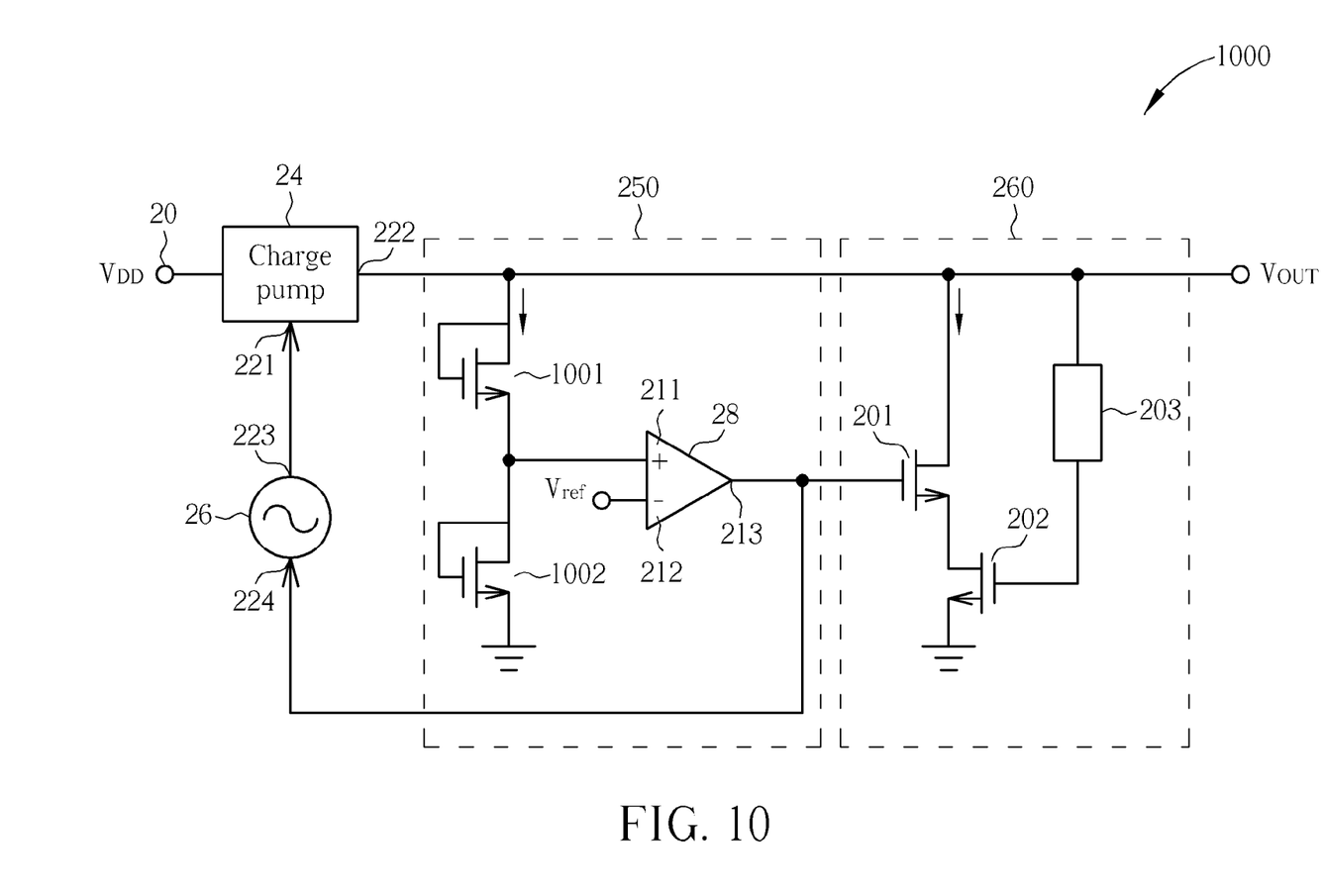
FIG. 10 shows the charge pump system of the ninth embodiment of the present invention.

Please refer to FIG. 10. FIG. 10 shows a charge pump system 1000 of the ninth embodiment of the present invention. The charge pump 1000 implements the first impedance 21 and the second impedance 22 of the charge pump system 200 with a first NMOS transistor 1001 and a second NMOS transistor 1002 respectively. As shown in FIG. 10, when the first impedance 21 and the second impedance 22 are implemented with the first NMOS transistor 1001 and the second NMOS transistor 1002 respectively, the drain of the first NMOS transistor 1001 is coupled to the gate of the first NMOS transistor 1001, and the drain of the second NMOS transistor 1002 is coupled to the gate of the second NMOS transistor 1002. The drain of the first NMOS transistor 1001 is coupled to the output end 222 of the charge pump 24, the drain of the second NMOS transistor 1002 and a source of the first NMOS transistor 1001 are both coupled to the first input end 211 of the comparator 28. And the source of the second NMOS transistor 1002 is coupled to ground. In the ninth embodiment, since the first NMOS transistor 1001 and the second NMOS transistor 1002 are smaller, the size of the charge pump 1000 can be effectively reduced.

Figure 11:
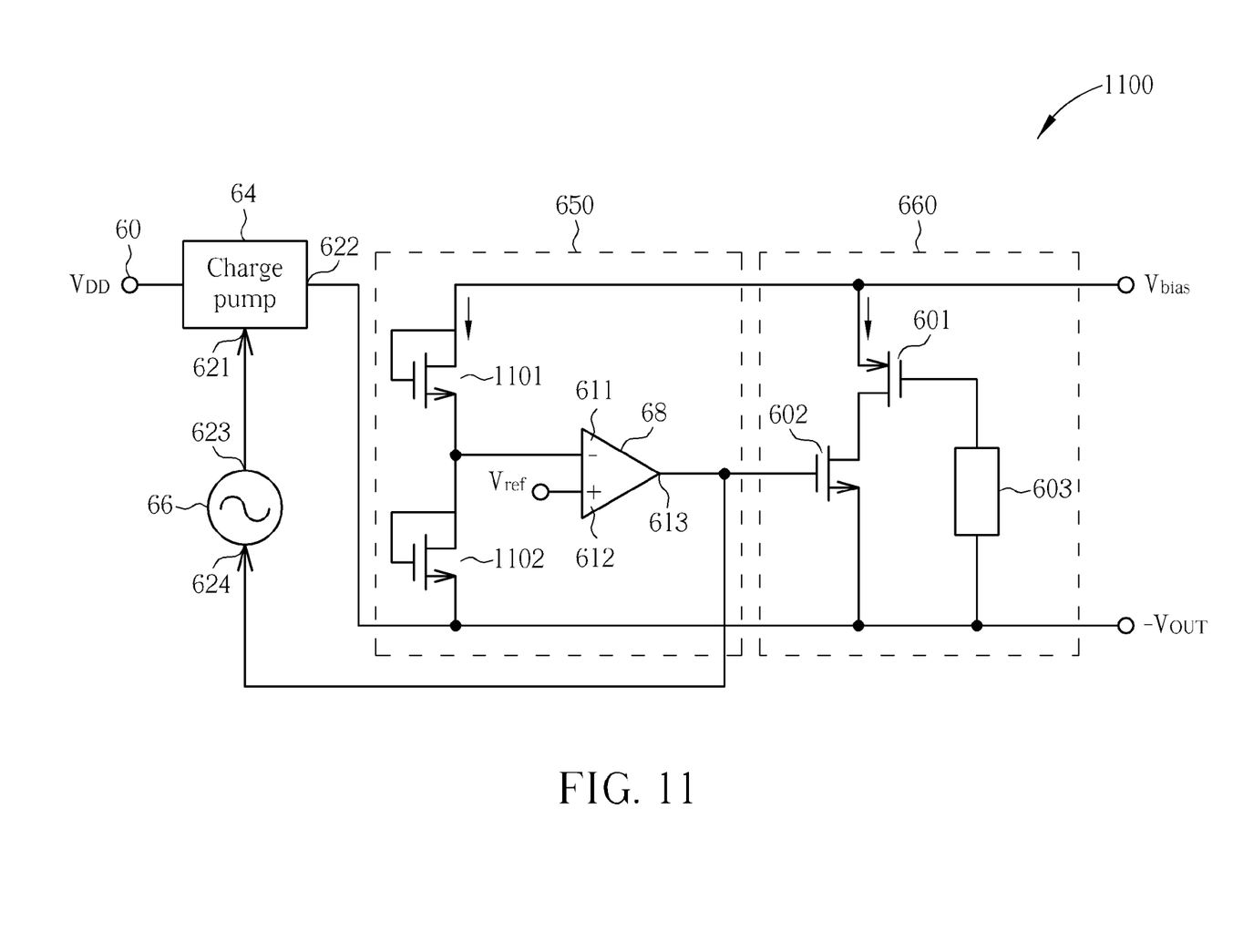
FIG. 11 shows the charge pump system of the tenth embodiment of the present invention.

Please refer to FIG. 11. FIG. 11 shows a charge pump system 1100 of the tenth embodiment of the present invention. The charge pump 1100 implements the first impedance 61 and the second impedance 62 of the charge pump system 600 with a first NMOS transistor 1101 and a second NMOS transistor 1102 respectively. As shown in FIG. 11, when the first impedance 61 and the second impedance 62 are implemented with the first NMOS transistor 1101 and the second NMOS transistor 1102 respectively, the drain of the first NMOS transistor 1101 is coupled to the gate of the first NMOS transistor 1101, and the drain of the second NMOS transistor 1102 is coupled to the gate of the second NMOS transistor 1102. The drain of the first NMOS transistor 1101 is coupled to the bias voltage source $V_{bias}$, a source of the first NMOS transistor 1101 and the drain of the second NMOS transistor 1101 are both coupled to the first input end 611 of the comparator 68, and a source of the second NMOS transistor 1102 is coupled to the output end 622 of the charge pump 64. In the tenth embodiment, due to the volumes of the first NMOS transistor 1101 and the second NMOS transistor 1102 are smaller, the volume of the charge pump 1100 can be effectively reduced.

Figure 12:
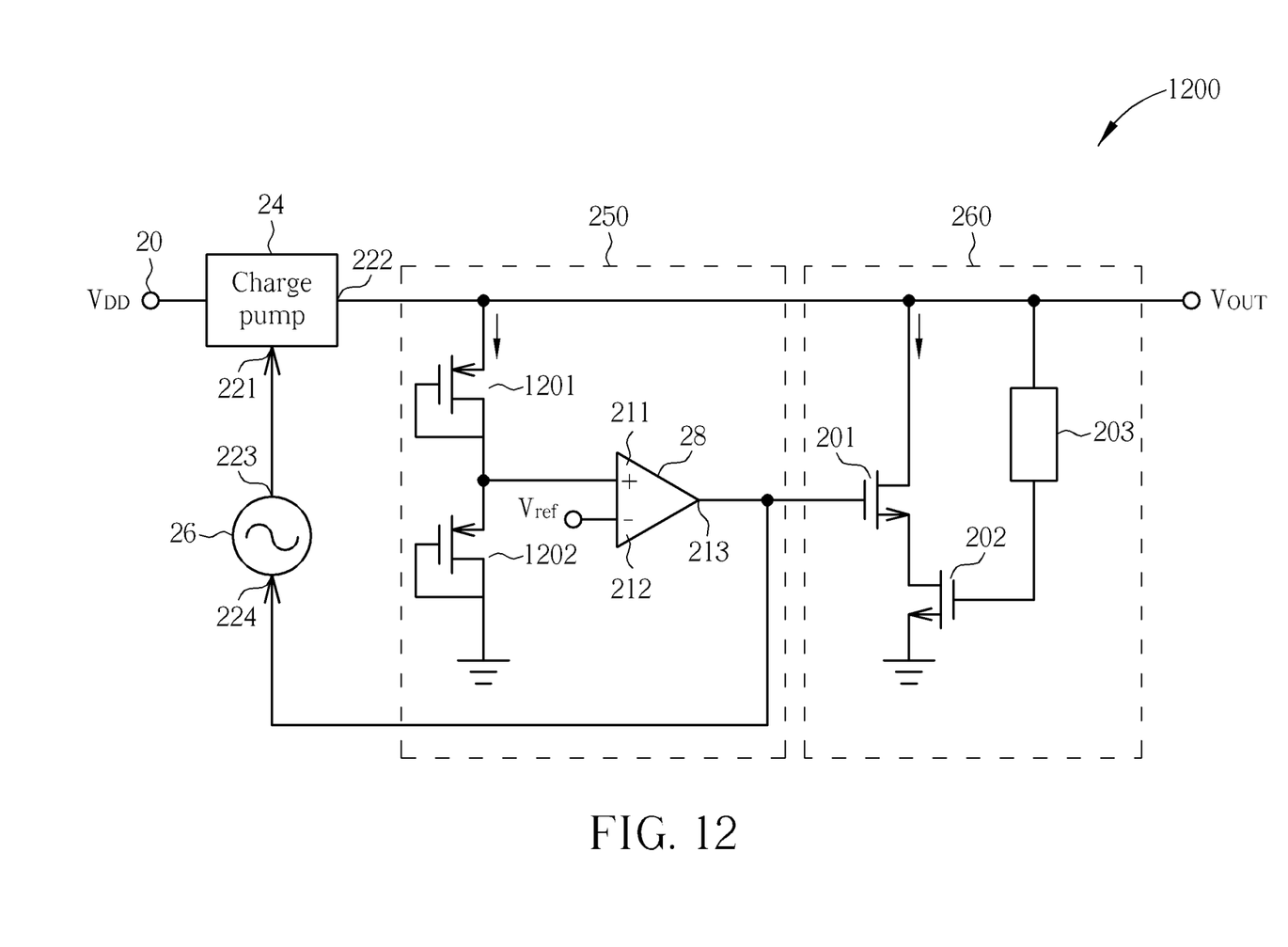
FIG. 12 shows the charge pump system of the eleventh embodiment of the present invention.

Please refer to FIG. 12. FIG. 12 shows a charge pump system 1200 of the eleventh embodiment of the present invention. The charge pump 1200 implements the first impedance 21 and the second impedance 22 of the charge pump system 200 with a first PMOS transistor 1201 and a second PMOS transistor 1202 respectively. As shown in FIG. 12, when the first impedance 21 and the second impedance 22 are implemented with the first PMOS transistor 1201 and the second PMOS transistor 1202 respectively, the drain of the first PMOS transistor 1201 is coupled to the gate of the first PMOS transistor 1201, and the drain of the second PMOS transistor 1202 is coupled to the gate of the second PMOS transistor 1202. A source of the first PMOS transistor 1201 is coupled to the output end 222 of the charge pump 24, a source of the second PMOS transistor 1202 and the drain of the first PMOS transistor 1201 are both coupled to the first input end 211 of the comparator 28. And the drain of the second PMOS transistor 1202 is coupled to ground. In the ninth embodiment, due to the volumes of the first PMOS transistor 1201 and the second PMOS transistor 1202 are smaller, the volume of the charge pump 1200 can be effectively reduced.

Figure 13:
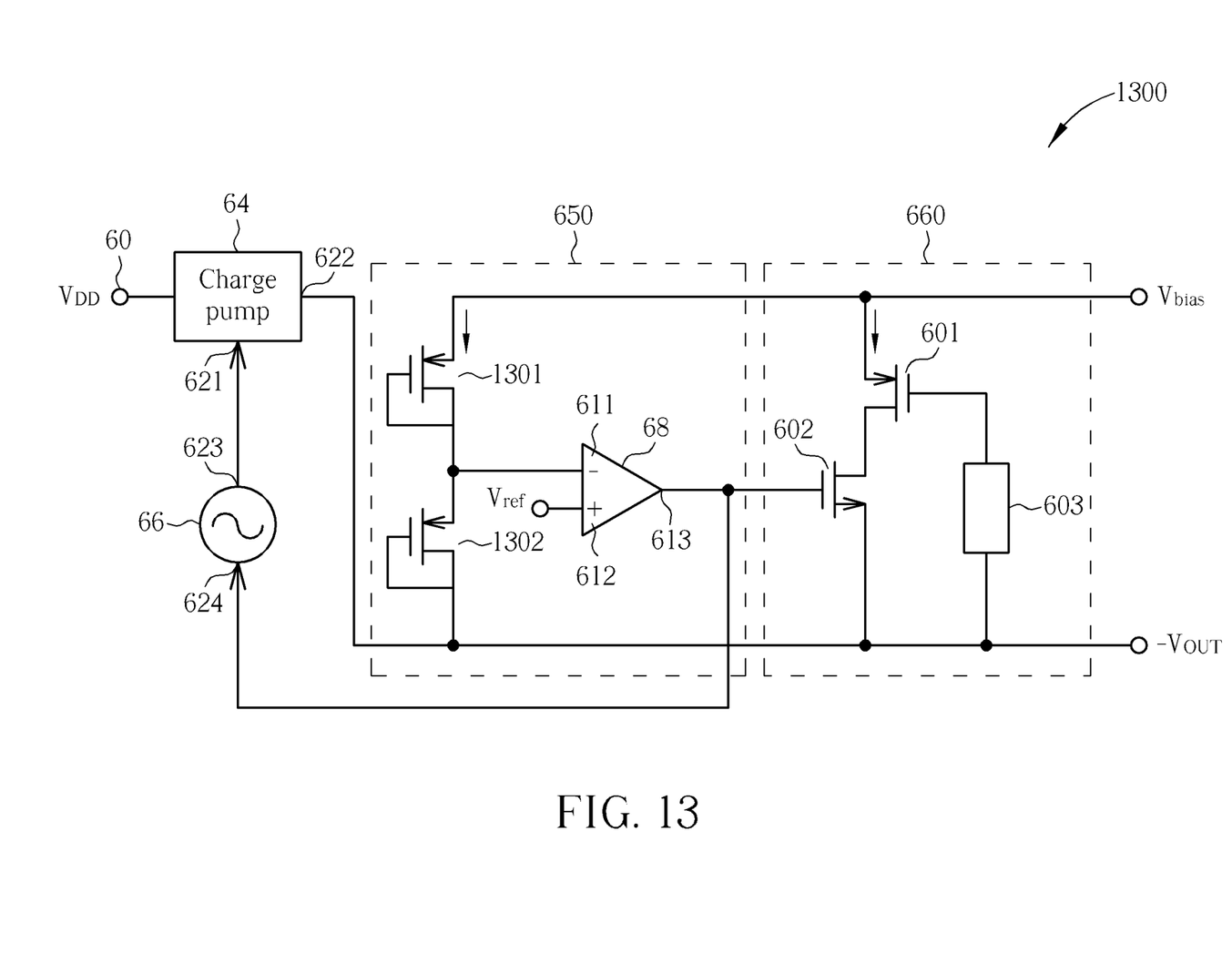
FIG. 13 shows the charge pump system of the twelfth embodiment of the present invention.

Please refer to FIG. 13. FIG. 13 shows a charge pump system 1300 of the twelfth embodiment of the present invention. The charge pump 1300 implements the first impedance 61 and the second impedance 62 of the charge pump system 600 with a first PMOS transistor 1301 and a second PMOS transistor 1302 respectively. As shown in FIG. 13, when the first impedance 61 and the second impedance 62 are implemented with the first PMOS transistor 1301 and the second PMOS transistor 1302 respectively, the drain of the first PMOS transistor 1301 is coupled to the gate of the first PMOS transistor 1301, and the drain of the second PMOS transistor 1302 is coupled to the gate of the second PMOS transistor 1302. A source of the first PMOS transistor 1301 is coupled to the bias voltage source $V_{bias}$, the drain of the first PMOS transistor 1301 and a source of the second PMOS transistor 1301 are both coupled to the first input end 611 of the comparator 68, and the drain of the second PMOS transistor 1302 is coupled to the output end 622 of the charge pump 64. In the tenth embodiment, due to the volumes of the first PMOS transistor 1301 and the second PMOS transistor 1302 are smaller, the volume of the charge pump 1300 can be effectively reduced.

Although the first impedance 21 and the second impedance 22 of the charge pump system 200 are implemented with the first NMOS transistor 1001 and the second NMOS transistor 1002 in the ninth embodiment, and are implemented with the first PMOS transistor 1201 and the second PMOS transistor 1202 in the eleventh embodiment. However, the first impedance 21 and the second impedance 22 of the charge pump system 200 can also be implemented with typical diodes. Similarly, although the first impedance 61 and the second impedance 62 of the charge pump system 600 are implemented with the first NMOS transistor 1101 and the second NMOS transistor 1102 in the tenth embodiment, and are implemented with the first PMOS transistor 1301 and the second PMOS transistor 1302 in the twelfth embodiment. However, the first impedance 61 and the second impedance 62 of the charge pump system 600 can also be implemented with typical diodes.

The present invention utilizes the discharge circuit 260 in the charge pump systems 200, 300, 400, 500, 1000 and 1200 to discharge the output voltage $V_{OUT}$ quickly. When the first impedance 21 and the second impedance 22 are both capacitors, the current flowing through the first impedance 21 and the second impedance 22 to ground can be effectively reduced, stabilizing the output voltage $V_{OUT}$. In the charge pump system 500, the ring oscillator 26 is not coupled to the output end 213 of the comparator 28, thus can avoid the delay of the ring oscillator 26 caused by repeatedly turning on and off the ring oscillator 26. In the charge pump system 1000, the first impedance 21 and the second impedance 22 are implemented with the first NMOS transistor 1001 and the second NMOS transistor 1002 respectively, thus effectively reducing the volume of the charge pump system 1000. In the charge pump system 1200, the first impedance 21 and the second impedance 22 are implemented with the first PMOS transistor 1201 and the second PMOS transistor 1202 respectively, thus effectively reducing the volume of the charge pump system 1200.

The present invention utilizes the charge circuit 660 in the charge pump systems 600, 700, 800, 900, 1100 and 1300 to charge the output voltage $-V_{OUT}$ quickly. When the first impedance 61 and the second impedance 62 are both capacitors, the current flowing through the first impedance 61 and the second impedance 62 to the output end 622 of the charge pump 64 can be effectively reduced, stabilizing the output voltage $-V_{OUT}$. In the charge pump system 900, the ring oscillator 66 is not coupled to the output end 613 of the comparator 68, thus can avoid the delay of the ring oscillator 66 caused by repeatedly turning on and off the ring oscillator 66. In the charge pump system 1100, the first impedance 61 and the second impedance 62 are implemented with the first NMOS transistor 1101 and the second NMOS transistor 1102 respectively, thus effectively reducing the volume of the charge pump system 1100. In the charge pump system 1300, the first impedance 61 and the second impedance 62 are implemented with the first PMOS transistor 1301 and the second PMOS transistor 1302 respectively, thus effectively reducing the volume of the charge pump system 1300.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charge pump system comprising:
a charge pump comprising an output end for providing an output voltage;
a ring oscillator comprising an output end coupled to a control end of the charge pump for providing an oscillation output to the charge pump;
a comparing circuit comprising:
a first impedance having a first end coupled to the output end of the charge pump;
a second impedance having a first end coupled to a second end of the first impedance, and a second end coupled to ground; and
a comparator comprising:
a first input end coupled to the second end of the first impedance;
a second input end for receiving a reference voltage; and
an output end; and
a discharge circuit comprising:
a first switch having a first end directly coupled to the output end of the charge pump, and a control end coupled to the output end of the comparator;
a second switch having a first end coupled to a second end of the first switch, and a second end coupled to the ground; and
a third impedance having a first end coupled to the output end of the charge pump, and a second end coupled to a control end of the second switch.

2. The charge pump system of claim 1, wherein the first input end of the comparator is a positive input end, the second input end of the comparator is a negative input end, and the first switch is an NMOS transistor.

3. The charge pump system of claim 1, wherein the first input end of the comparator is a negative input end, the second input end of the comparator is a positive input end, and the first switch is a PMOS transistor.

4. The charge pump system of claim 1, wherein the second switch is an NMOS transistor.

5. The charge pump system of claim 1, wherein the output end of the comparator is coupled to an input end of the ring oscillator.

6. The charge pump system of claim 1, wherein the first impedance and the second impedance are resistors.

7. The charge pump system of claim 1, wherein the first impedance and the second impedance are capacitors.

8. The charge pump system of claim 1, wherein the first impedance and the second impedance are NMOS transistors, and a drain of each NMOS transistor is coupled to a source of the NMOS transistor.

9. The charge pump system of claim 1, wherein the first impedance and the second impedance are PMOS transistors, and a drain of each PMOS transistor is coupled to a source of the PMOS transistor.

10. The charge pump system of claim 1, wherein the third impedance is a resistor.

11. The charge pump system of claim 1, wherein the third impedance is a capacitor.

12. The charge pump system of claim 1, wherein the third impedance is a diode.

13. The charge pump system of claim 1, further comprising a fourth impedance having a first end coupled to the second end of the third impedance, and a second end coupled to the ground.

14. The charge pump system of claim 13, wherein the third impedance and the fourth impedance are resistors.

15. The charge pump system of claim 13, wherein the third impedance and the fourth impedance are capacitors.

16. The charge pump system of claim 13, wherein the third impedance and the fourth impedance are diodes.

17. A charge pump system comprising:
  a charge pump comprising an output end for providing an output voltage;
  a ring oscillator comprising an output end coupled to a control end of the charge pump for providing an oscillation output to the charge pump;
  a comparing circuit comprising:
    a first impedance having a first end directly coupled to a bias voltage source;
    a second impedance having a first end coupled to a second end of the first impedance, and a second end coupled to the output end of the charge pump; and
  a comparator comprising:
    a first input end coupled to the second end of the first impedance;
    a second input end for receiving a reference voltage; and
    an output end; and
  a charge circuit comprising:
    a first switch having a first end directly coupled to the bias voltage source;
    a second switch having a first end coupled to a second end of the first switch, a control end coupled to the output end of the comparator, and a second end coupled to the output end of the charge pump; and
    a third impedance having a first end coupled to a control end of the first switch, and a second end coupled to the output end of the charge pump.

18. The charge pump system of claim 17, wherein the first input end of the comparator is a negative input end, the second input end of the comparator is a positive input end, and the second switch is an NMOS transistor.

19. The charge pump system of claim 17, wherein the first input end of the comparator is a positive input end, the second input end of the comparator is a negative input end, and the second switch is a PMOS transistor.

20. The charge pump system of claim 17, wherein the first switch is a PMOS transistor.

21. The charge pump system of claim 17, wherein the output end of the comparator is coupled to an input end of the ring oscillator.

22. The charge pump system of claim 17, wherein the first impedance and the second impedance are resistors.

23. The charge pump system of claim 17, wherein the first impedance and the second impedance are capacitors.

24. The charge pump system of claim 17, wherein the first impedance and the second impedance are NMOS transistors, and a drain of each NMOS transistor is coupled to a source of the NMOS transistor.

25. The charge pump system of claim 17, wherein the first impedance and the second impedance are PMOS transistors, and a drain of each PMOS transistor is coupled to a source of the PMOS transistor.

26. The charge pump system of claim 17, wherein the second end of the third impedance is coupled to the output end of the charge pump.

27. The charge pump system of claim 17, wherein the third impedance is a resistor.

28. The charge pump system of claim 17, wherein the third impedance is a capacitor.

29. The charge pump system of claim 17, wherein the third impedance is a diode.

30. The charge pump system of claim 17, further comprising a fourth impedance having a first end coupled to the bias voltage source, and a second end coupled to the first end of the third impedance.

31. The charge pump system of claim 30, wherein the third impedance and the fourth impedance are resistors.

32. The charge pump system of claim 30, wherein the third impedance and the fourth impedance are capacitors.

33. The charge pump system of claim 30, wherein the third impedance and the fourth impedance are diodes.

* * * * *